Patented Mar. 23, 1954

2,673,200

UNITED STATES PATENT OFFICE 2,673,200

AZO DYESTUFFS

Hans Ruckstuhl, Otto Senn, and Walter Wehrli, Basel, Switzerland, assignors to Sandoz A. G., Basel, Switzerland, a Swiss firm No Drawing. Application June 19, 1951, Serial No. 232,447

Claims priority, application Switzerland June 21, 1950

14 Claims. (Cl. 260—145)

The present invention relates to new azo dyestuffs and to the preparation thereof.

A primary object of the invention is the embodiment of a new group of azo dyestuffs characterized by superior fastness properties, especially fastness to washing and to light. A further object of the invention is the embodiment of azo dyestuffs, the dyeings of which on textiles are in pure khaki shades so that the latter may be realized without the use of mixed dyes as has heretofore been necessary when producing khaki dyeings with azo dyes.

These objects, and other which will hereinafter be evident, are realized by the new azo dyestuffs according to the present invention, said dyestuffs corresponding to the formula (A) 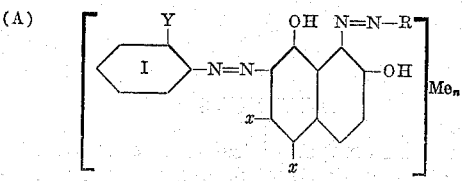

wherein R stands for an aryl, an arylazoaryl or an arylazo-arylazoaryl radical, one $x$ stands for $SO_3H$ and the other $x$ for hydrogen, Y stands for a metallizable group, Me stands for copper or chromium, $n$ represents one of the integers 0, 1, 2 and 3 and wherein nucleus I may contain additional substituents, e. g. $SO_3H$, $NO_2$, halogen, lower alkyl and/or lower alkoxy.

These new azo dyestuffs are prepared, according to the present invention, by coupling the desired diazo compound with 1 mol of a monoazo dyestuff—as such or in the form of the metal complex—of the following composition:

(B) 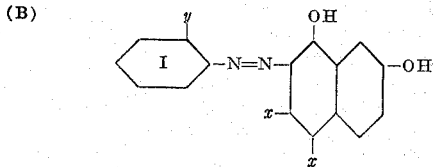

wherein one $x$ stands for $SO_3H$ and the other $x$ for hydrogen, and $y$ stands for a metallizable group, and wherein nucleus I may contain additional substituents, e. g. $SO_3H$, $NO_2$, halogen, lower alkyl and/or lower alkoxy, and if necessary treating the resultant disazo or polyazo dyestuff in substance or on the fiber with metal-yielding agents.

That azo dyestuffs of constitution (B) are capable of coupling at all was surprising, unforeseeable and unexpected, since it is a known general fact that primary disazo dyestuffs can not be prepared from 2,8-dihydroxynaphthalene-6-sulfonic acids; see Fierz, Zeitschr. angew., Chem., vol. 49, page 24 (1936).

The products obtained according to the precedingly described process are valuable dyestuffs or are intermediates for the production of such dyesutffs. They comprise an entire series which makes possible the achievement of pure khaki dyeings in shades which have heretofore been obtainable by means of azo dyestuffs only when a mixture of the latter has been employed.

As previously indicated, a wide variety of diazo compounds may be employed in preparing the products of this invention. Illustrative of such are the diazo compounds of, inter alia, 2 - aminobenzene-1-carboxylic acid, 5-nitro-2-amino-1-methoxybenzene, 5-nitro-2-aminobenzene-1-carboxylic acid, 4'-amino-3'-methoxy-5-methyl-4-hydroxy-1,1'-azobenzene-3-carboxylic acid, 2-hydroxybenzene - 1 - carboxylic acid←4,4' - diaminodiphenyl→1 - amino - 2 - methoxy - 5-methylbenzene, 5 - amino - 2 - hydroxybenzene-1 - carboxylic acid - 3 - sulfonic acid→3 - methyl-1 - aminobenzene→1 - amino - 2 - methoxy - 5-methylbenzene, 2 - hydroxybenzene - 1 - carboxylic acid←4 - (4' - aminobenzoylamino) - 1-aminobenzene→1 - amino - 2 - methoxy - 5 - methylbenzene, 2 - naphthylamine - 4,8 - disulfonic acid→3 - methyl - 1 - aminobenzene→1-amino - 2 - methoxy - 5 - methylbenzene, 2-naphthylamine - 6,8 - disulfonic acid→3 - methyl - 1 - aminobenzene→1 - amino - 2 - methoxy-5 - methylbenzene, etc.; the intermediates from one mol of tetrazotized 4,4'-diaminodiphenyl and one mol of 2-hydroxybenzene-1-carboxylic acid or from one mol of tetrazotized 4,4'-diamino-3,3'-dimethoxydiphenyl and one mol of any desired naphthol monosulfonic acid or naphthol disulfonic acid, etc. may also be used in this regard.

The trisazo and polyazo dyestuffs of the present invention are suitable for dyeing cotton and regenerated cellulose by the methods conventionally used for direct dyestuffs. In so far as the new products are dyestuffs which contain free metallizable groups, their fastness properties can be improved by aftertreatment on the fiber with salts of bivalent metals, especially with copper sulfate. In so far as the new products already contain metal in the molecule thereof, they can advantageously be aftertreated with salts of bivalent copper in the presence of polymeric substances containing imino or amino groups, such as the substances described in Swiss Patents Nos. 253,709, 261,048, 263,481 and 263,482; this treatment results in many cases in the attainment of outstanding wash fastness and light fastness properties.

The following examples illustrate the invention, without however limiting the scope thereof. Parts and percentages are by weight. The term "soda" refers to sodium carbonate.

EXAMPLE 1

The tetrazo compound from 24.4 parts of 3,3'-dimethoxy-4,4'-diaminodiphenyl is coupled in alkaline medium with 30.3 parts of 1-hydroxynaphthalene-3,8-disulfonic acid. The obtained intermediate is then run into a solution of the disodium salt of 45.4 parts of the monoazo dyestuff corresponding to the formula:

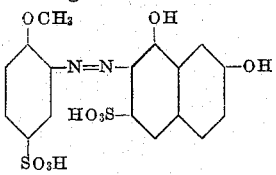

in 400 parts of water and 1000 parts of pyridine. Upon completion of the resultant coupling, the produced trisazo dyestuff of the formula

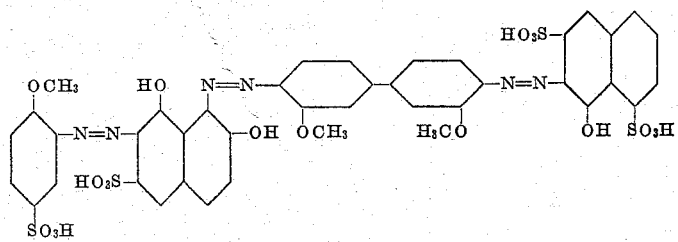

is separated from the pyridine and purified by recrystallization. Dried and ground, it is a dark powder which dissolves in water with a blue coloration and in concentrated sulfuric acid with a reddish blue coloration, and dyes cotton or regenerated cellulose in reddish marine-blue shades, the fastness properties of which are improved by aftercoppering, the copper complex—with valuable dyestuff properties—being produced by boiling the said trisazo dyestuff in dilute aqueous ammonia with addition of 75 parts of copper sulfate.

The copper complex compound corresponds to the formula:

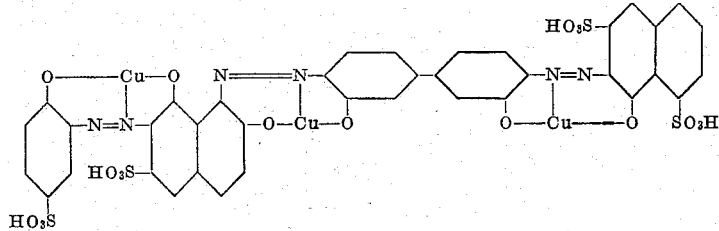

EXAMPLE 2

The intermediate, produced by tetrazotization and coupling, from 18.4 parts of 4,4'-diaminodiphenyl and 13.8 parts of 2-hydroxybenzoic acid, is run into a solution of 46.8 parts of the monoazo dyestuff corresponding to the formula

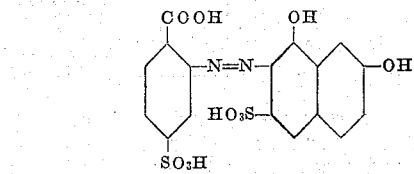

in 400 parts of water and 1000 parts of pyridine. Upon completion of the coupling which takes place, the pyridine is removed and the obtained trisazo dyestuff of the formula

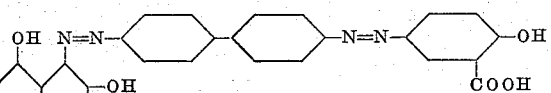

is purified by recrystallization. Dried and ground, it is a dark powder which dissolves in water with a yellowish brown coloration and in concentrated sulfuric acid with a Bordeaux red coloration, and dyes cotton or regenerated cellulose in khaki-colored shades, the fastness properties of which are improved by an after-coppering treatment as described in Example 1.

By replacing the aforesaid monoazo dyestuff by its copper complex and coupling the latter with the intermediate from 4,4'-diaminodiphenyl and 1-hydroxybenzene-2-carboxylic acid, according to the prescriptions of the preceding paragraph, a dyestuff is obtained which dyes cotton in greenish khaki shades.

EXAMPLE 3

The tetrazo compound from 18.4 parts of 4,4'-diaminodiphenyl is coupled with 13.8 parts of 1-hydroxybenzene-2-carboxylic acid, and the resultant intermediate is then reacted with the monoazo dyestuff described in Example 1 according to the prescriptions set forth in the latter. The obtained dyestuff is a dark powder which dissolves in water with a yellowish brown coloration and in concentrated sulfuric acid with a Bordeaux red coloration, and dyes cotton or regenerated cellulose in khaki-colored shades, the fastness properties of which are improved by aftercoppering with formation of the corresponding copper complex.

EXAMPLE 4

30.3 parts of 2-aminonaphthalene-4,8-disulfonic acid are diazotized and coupled in acetic acid solution with 10.7 parts of 3-amino-1-methylbenzene. The obtained aminoazo dyestuff is diazotized and coupled, in a medium acidified with acetic acid, with 13.7 parts of 2-amino-1-methoxy-4-methylbenzene. After further diazotization, the product is coupled with 46.8 parts of the monoazo dyestuff described in Example 2 according to the prescriptions set forth in the latter. The resultant dyestuff is, following purification by recrystallization, a dark powder which dissolves in water with brown coloration and in concentrated sulfuric acid with violet coloration. It dyes cotton and regenerated cellulose in brown shades. The copper complex of the last-named dyestuff—obtained in ammoniacal solution with the aid of 50 parts of copper sulfate—yields khaki shades of excellent fastness to light.

EXAMPLE 5

The diazo compound from 35.1 parts of 4'-amino - 2' - methyl - 4 - hydroxy - 1,1' - azobenzene-5-carboxy-3-sulfonic acid is coupled in acetic acid solution with 13.7 parts of 2-amino-4-methyl-1-methoxybenzene. The resultant intermediate is diazotized and coupled in pyridine-containing solution with the copper complex—prepared in ammoniacal solution with the aid of copper sulfate—from 46.8 parts of the dyestuff of the formula:

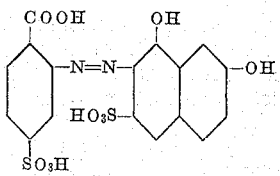

After isolation and drying of the reaction product, there is obtained a dark powder which dissolves in water with a brownish olive coloration and concentrated sulfuric acid with a violet coloration. It dyes cotton and regenerated cellulose in brown shades, the fastness properties of which are improved by aftertreatment with a salt of bivalent copper, e. g. copper sulfate, in the presence of the polymeric substance which is obtained by condensing triethylene tetramine with dicyandiamide according to the process described in the Swiss Patent No. 253,709.

By introducing a second atom of copper into the dyestuff by means of a treatment with copper compounds splitting off the methoxy group, there is obtained a product of still better fastness properties.

EXAMPLE 6

The intermediate prepared by tetrazotization and coupling, from 18.4 parts of 4,4'-diaminodiphrenyl and 13.8 parts of 1-hydroxybenzene-2-carboxylic acid, is coupled in acetic acid solution with 13.7 parts of 2-amino-4-methyl-1-methoxy-benzene. After further diazotization, the product is coupled in approximately 50% pyridine solution with the copper complex from 46.8 parts of the monoazo dyestuff employed in Example 2. The resultant dyestuff is, after having been purified by recrystallization, dried and ground, a dark powder which dissolves in water with an olive coloration and in concentrated sulfuric acid with a violet coloration. It dyes cotton and regenerated cellulose in brownish khaki shades which, upon aftertreatment with a salt of bivalent copper, e. g. copper sulfate, in the presence of the polymeric substance obtainable by condensing triethylene tetramine with dicyandiamide according to the process described in the Swiss Patent No. 253,709, are fast to light and to washing.

EXAMPLE 7

The tetrazo compound from 22.7 parts of 4-(4'-aminobenzoylamino)-1-aminobenzene is first coupled in soda-alkaline solution with 13.8 parts of 1-hydroxybenzene-2-carboxylic acid and then in acetic acid solution with 13.7 parts of 2-amino-4-methyl-1-methoxybenzene. The resultant intermediate is diazotized and then coupled in approximately 50% aqueous pyridine solution with 45.4 parts of the monoazo dyestuff employed in Example 1.

The thus prepared dyestuff is, after isolation and purification (by recrystallization) followed by drying and grinding, a dark powder which dissolves in water with an olive coloration and in concentrated sulfuric acid with a violet coloration. It dyes cotton and regenerated cellulose in olive shades which, upon aftertreatment with a salt of bivalent copper—for example copper sulfate in ammoniacal solution—turn toward khaki and are improved in their fastness properties.

If, as coupling component, use is made of the copper complex of the aforesaid monoazo dyestuff of Example 1, and the procedure set forth in the preceding paragraphs of the present example otherwise followed, the product is a dyestuff which dissolves in water with a brown coloration and in concentrated sulfuric acid with a red-brown coloration, and yields brownish khaki dyeings on cotton and regenerated cellulose, the wet fastness properties of which can be improved by aftertreatment according to the data of Example 5.

By introducing a second atom of copper into the dyestuff by splitting off the methoxy group, there is obtained a copper complex which yields olive brown dyeings of good light fastness on cotton and regenerated cellulose. The said complex dissolves in water with an olive brown coloration and in concentrated sulfuric acid with a reddish brown coloration.

EXAMPLE 8

By coupling the diazodisazo compound employed in Example 7 with the copper complex from 46.8 parts of the monoazo dyestuff employed in Example 2 in the manner described in the latter, there is obtained a dyestuff which dissolves in water with an olive coloration and in concentrated sulfuric acid with a reddish brown coloration, and dyes cotton and regenerated cellulose in yellowish khaki shades of good appearance. By aftertreatment with copper sulfate or according to the procedure described in Example 5, the fastness properties of the product are improved. The copper complex compound obtained by a treatment with copper splitting off the methoxy group possesses also valuable fastness properties.

EXAMPLE 9

30.3 parts of 2-aminonaphthalene-6,8-disulfonic acid are diazotized and coupled in acetic acid solution with 10.7 parts of 3-amino-1-methylbenzene. The aminoazo dyestuff is diazotized and coupled in acetic acid solution with 13.7 parts of 2-amino-4-methyl-1-methoxybenzene. After further diazotization, the product is coupled in 50% aqueous pyridine solution with the copper complex from 46.8 parts of the monoazo dyestuff employed in Example 2. The resultant tetrakisazo dyestuff is isolated and boiled for 24 hours in ammoniacal solution with 25 parts of copper sulfate under reflux. The product is isolated and, after having been purified by recrystallization, dried and ground, is a dark powder which dissolves in water with an olive coloration and in concentrated sulfuric acid with a violet coloration, and dyes cotton or regenerated cellulose in brownish khaki shades. The dyeings may be aftertreated in accordance with the aftertreatment described in Example 5. By replacing the initial component (2-aminonaphthalene-6,8-disulfonic acid) by the equivalent amount of 2-amino-naphthalene-4,8-disulfonic acid, and otherwise following the precedingly described procedure, a dyestuff of substantially similar properties is obtained.

EXAMPLE 10

35.1 parts of 4'-amino-2'-methyl-5'-methoxy-4-hydroxyazobenzene-5-carboxylic acid are diazotized and coupled in 50% aqueous pyridine solution with 45.4 parts of the monoazo dyestuff employed in Example 1. The resultant trisazo dyestuff is isolated and converted, in the manner described in Example 9, using 50 parts of copper sulfate, into the copper complex compound containing 2 atoms of copper. The product is a dark powder which dissolves in water with brown coloration and in concentrated sulfuric acid with violet coloration, and dyes cotton or regenerated cellulose in somewhat violet brown shades.

EXAMPLE 11

By using the diazodisazo compound of Example 6 for coupling with the copper complex from 46.8 parts of the monoazo dyestuff corresponding to the formula

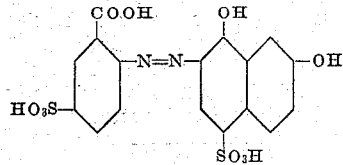

in approximately 50% aqueous pyridine solution, there is obtained—after working up the product in the general manner described in the preceding examples—a dark powder which dissolves in water with olive coloration and in concentrated sulfuric acid with violet coloration, and dyes cotton and regenerated cellulose in brownish khaki shades, the fastness properties of which are enhanced by aftertreatment as described in the preceding examples.

EXAMPLE 12

17.3 parts of 4-aminobenzene-1-sulfonic acid are diazotized and the obtained diazo compound coupled with 38.8 parts of the monoazo dyestuff corresponding to the formula

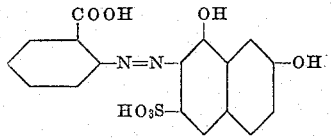

in solution in 400 parts of water, 200 parts of pyridine and 25 parts of concentrated aqueous ammonia. Upon completion of the coupling which takes place, the formed dyestuff is isolated and dried, whereupon a dark powder is obtained which dissolves in dilute caustic soda solution with brown-red coloration and in concentrated sulfuric acid with green coloration. The new dyestuff yields afterchromed dyeings on wool, which are of full brown tone.

EXAMPLE 13

16.8 parts of 5-nitro-2-methoxy-1-aminobenzene are diazotized and the obtained diazo compound coupled with 38.8 parts of the monoazo dyestuff corresponding to the formula

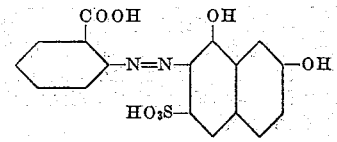

in solution in 400 parts of water, 200 parts of pyridine and 25 parts of concentrated aqueous ammonia. Upon completion of the coupling which takes place, the formed dyestuff is isolated and dried, whereupon a dark powder is obtained which dissolves in dilute caustic soda solution with brown coloration and in concentrated sulfuric acid with green coloration. Afterchromed, the dyestuff yields deep brown shades on wool.

EXAMPLE 14

16.8 parts of 5-nitro-2-methoxy-1-aminobenzene are diazotized and the resultant diazo compound coupled with 38.8 parts of the monoazo dyestuff which corresponds to the formula

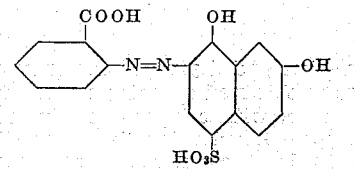

in solution in 400 parts of water, 200 parts of pyridine and 25 parts of concentrated aqueous ammonia. The produced dyestuff is filtered off directly. Dried, it is a dark powder which dissolves in dilute caustic soda solution with brown-red coloration and in concentrated sulfuric acid with green coloration.

The new dyestuff yields afterchromed dyeings on wool which are of deep brown shades.

EXAMPLE 15

The tetrazo compound from 24.4 parts of 4.4'-diamino-diphenyl-3-sulfonic acid is coupled with 13.8 parts of 1-hydroxybenzene-2-carboxylic acid and with 13.7 parts of 2-amino-4-methyl-1-methoxybenzene. The resultant intermediate is then diazotized and coupled in an aqueous solution containing 50% of pyridine with the copper complex obtained from 46.8 parts of the monoazo dyestuff described in Example 2. The thus obtained dyestuff is, following isolation and purification, converted into the complex compound containing 2 atoms of copper by means of a splitting off the methoxy group treatment with copper sulfate. The copper complex is a dark powder which dissolves in water with an olive coloration and in concentrated sulfuric acid with a violet coloration. It dyes cotton and regenerated cellulose in fast khaki shades, the fastness properties of which are improved by an after-treatment as described in Example 5.

If, as second coupling component, use is made of 18 parts of 2-amino-4-acetylamino-1-methoxybenzene instead of 2-amino-4-methyl-1-methoxybenzene, there is obtained a similar dyestuff possessing a somewhat more brownish shade.

The following table sets forth additional examples of dyestuffs according to the invention, the procedure being as described in Examples 1 to 11 and 15.

| Example No. | Diazotized Intermediate | Coupling Component | Copper Content of End Product | Color of Solution in— | | Dyeing on Cotton | |
| --- | --- | --- | --- | --- | --- | --- | --- |
| | | | | H₂O | H₂SO₄ | Direct | After-treated |
| 16 | Intermediate according to Example 2 (1st paragraph) | 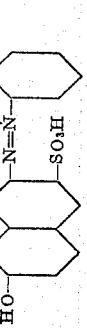 | 1 atom | khaki | violet | khaki | somewhat yellower. |
| 17 | ....do.... | 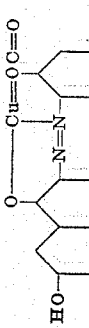 | ....do.... | ....do.... | ....do.... | ....do.... | Do. |
| 18 | 1-hydroxybenzene-2-carboxylic acid ←→ 4-(4'-aminobenzoylamino)-1-aminobenzene ←→ 2-amino-4-methyl-1-methoxybenzene. |  | ....do.... | ....do.... | brown | yellowish khaki | Do. |
| 19 | 2-naphthylamine-6,8-disulfonic acid ⟶ 3-amino-1-methylbenzene ⟶ 2-amino-4-methyl-1-methoxybenzene. | 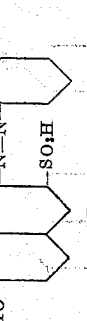 | 2 atoms | ....do.... | violet | brownish khaki | Do. |
| 20 | 2-naphthylamine-4,8-disulfonic acid ⟶ 3-amino-1-methylbenzene ⟶ 2-amino-4-methyl-1-methoxybenzene. | 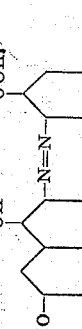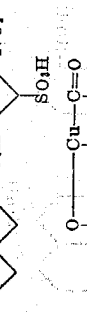 | (¹) 2 atoms | brown ....do.... | blue violet ....do.... | brown ....do.... | brown. Do. |
| 21 | 1-hydroxybenzene-2-carboxylic acid ←→ 4-(4'-aminobenzoylamino)-1-aminobenzene ←→ 2-amino-4-methyl-1-methoxybenzene. | 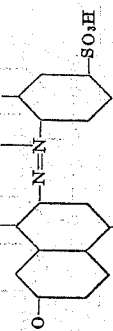 | 1 atom 2 atoms | khaki ....do.... | brown ....do.... | khaki yellowish khaki | somewhat yellower. yellowish khaki. |

¹ No aftercoppering.

| Example No. | Diazotized Intermediate | Coupling Component | Copper Content of End Product | Color of Solution in— | | Dyeing on Cotton | |
|---|---|---|---|---|---|---|---|
| | | | | H₂O | H₂SO₄ | Direct | After-treated |
| 22 | 4-amino-1-hydroxybenzene-2-carboxylic acid-6-sulfonic acid ⟶ 3-amino-1-methylbenzene ⟶ 2-amino-4-methyl-1-methoxybenzene. | [structure] | 1 atom | yellowish brown | violet | brown | brown. |
| | | | 2 atoms | do | do | do | Do. |
| 23 | 2-aminobenzene-1-carboxylic acid ⟶ [structure] ⟶ 2-amino-4-methyl-1-methoxy-benzene. | [structure] | 3 atoms | khaki | olive | khaki | khaki. |
| 24 | do | [structure] | do | yellow-brown | brown-violet | brownish khaki | brownish khaki. |

The following are formulae of representative products of the foregoing examples.
*Example 5*
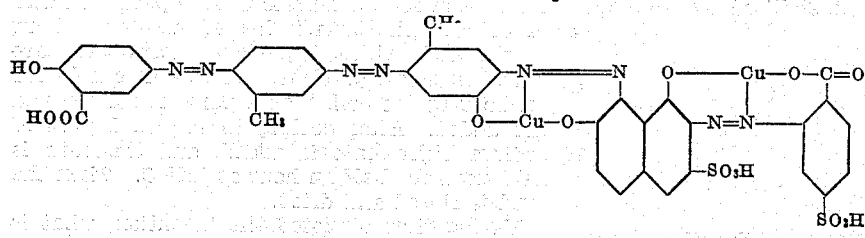
*Example 6*
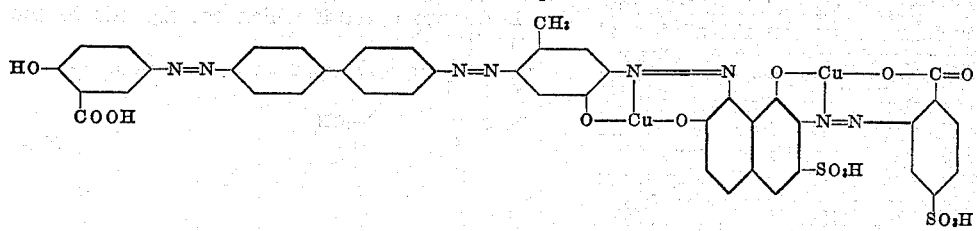
*Example 7*
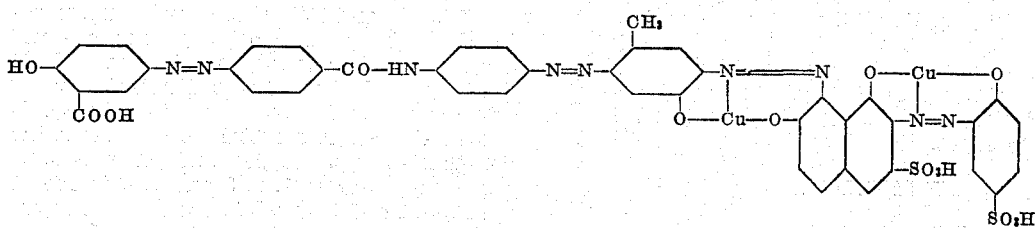
*Example 8*
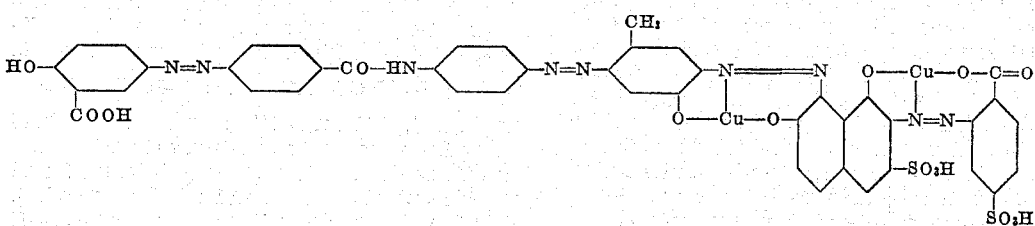
*Example 9*
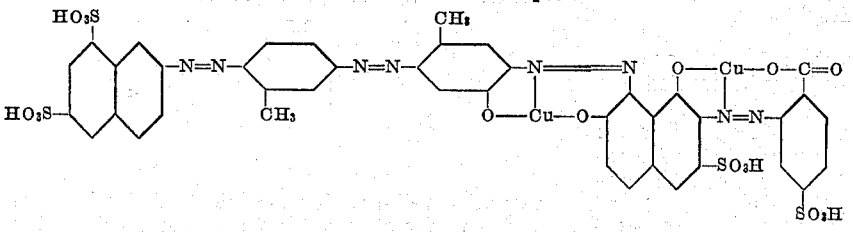
*Example 11*
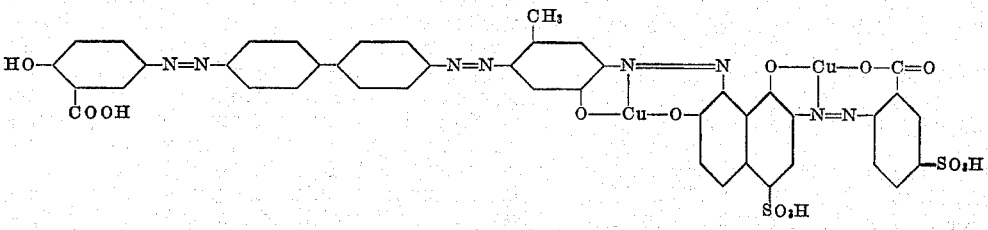
*Example 15*
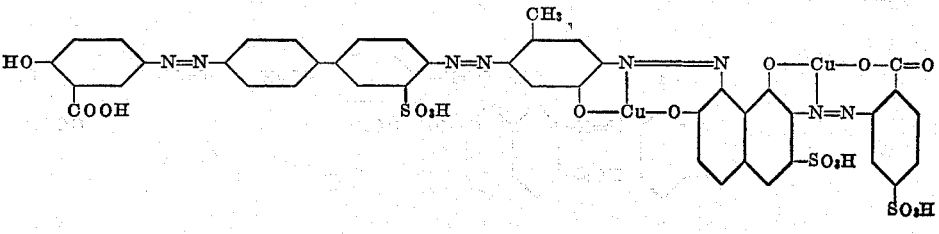

Monoazo dyestuffs corresponding to Formula B, supra, can be prepared by substituting an OH group for the amino group in the corresponding metallized or unmetallized dyestuff of the formula

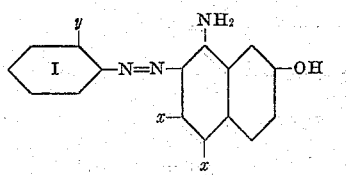

wherein one $x$ stands for $SO_3H$ and the other $x$ for hydrogen, and $y$ stands for a metallizable group, and wherein nucleus I may contain additional substituents, as previously enumerated. The replacement of the amino group by the hydroxyl group can, in neutral to caustic alkaline medium, be carried out in a wide variety of ways. In some cases, simple heating of the aqueous solution of the dyestuff under reflux suffices to effect the desired replacement; in other cases, heating for several hours to temperatures of, for instance, 140–150° in an autoclave may be necessary. In acid medium, the aforesaid replacement can be realized by heating for a brief period of time with dilute mineral acid.

The following example illustrates the preparation of the monoazo dyestuff employed in Example 2, supra.

EXAMPLE 25

46.7 parts of the dyestuff obtained from 1-carboxy-2-diazobenzene-4-sulfonic acid and 1-amino-7-hydroxynaphthalene-3-sulfonic acid in acetic acid solution are heated for 2 hours to 140–150° in 500 parts of 2% aqueous caustic soda solution. The dyestuff separated by salting out and filtration, is a red powder which dissolves in water with reddish coloration and in concentrated sulfuric acid with brown-red coloration. It corresponds to the formula set forth for the monoazo dyestuff in Example 2.

EXAMPLE 26

Dyeing with a representative dyestuff according to the present invention may be carried out, for example as follows.

a. Dyestuffs of Examples 1 to 11 and 15 to 24:

100 parts of cotton or regenerated cellulose fiber cloth are introduced into a dyebath containing a solution of 1 part of the dyestuff and 20 parts of sodium sulfate in 3000 parts of water of 30° C. The dyebath is heated within half an hour to the boil, boiled for 15 minutes and then cooled in 15 minutes to 50° C. After being rinsed, the cloth is added to a fresh bath containing 3000 parts of water of 70° and 0.5 part of the copper complex compound of the condensation product of triethylene tetramine and dicyan diamide obtainable according to the process of the Swiss Patent No. 253,709. The bath is held for half an hour at 70°, then the cloth is rinsed and dried.

b. Dyestuffs of Examples 12 to 14:

100 parts of wool are entered into a bath containing a solution of 1 part of the dyestuff and 10 parts of sodium sulfate in 4000 parts of water of 30° C. The bath is heated within an hour to the boil, whilst 2 parts of acetic acid are added in small portions. The bath is held for an hour at the boil, then 2 parts of formic acid are added. After cooling to 70° C., 1 part of sodium bichromate is added, and the bath is held anew for half an hour at 100° C. Then the wool is rinsed and dried.

Having thus disclosed the invention, what is claimed is:

1. An azo dyestuff which corresponds to the formula

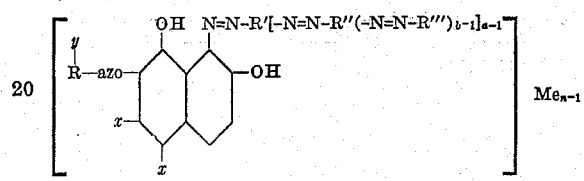

wherein R stands for a radical of the benzene series, R', R" and R''' stand for members selected from the group consisting of mono- and binuclear radicals, one $x$ stands for the sulfonic acid group and the other $x$ for hydrogen, $y$ stands for a metallizable group in ortho-position to -azo-, Me is a metal selected from the group consisting of copper and chromium, $n$ is one of the integers 1, 2, 3 and 4, $a$ is one of the integers 1 and 2, and $b$ is one of the integers 1 and 2, when $a$ is 2, and is 1, when $a$ is 1.

2. A process for the manufacture of an azo dyestuff comprising the steps of coupling a diazotized amine which corresponds to the formula $$H_2N-R'[-N=N-R''(-N=N-R''')_{b-1}]_{a-1}$$

wherein, R', R" and R''' stand for members selected from the group consisting of mono- and binuclear radicals, $a$ is one of the integers 1 and 2, and $b$ is one of the integers 1 and 2, when $a$ is 2, and is 1, when $a$ is 1, with a monoazo dyestuff which corresponds to the formula

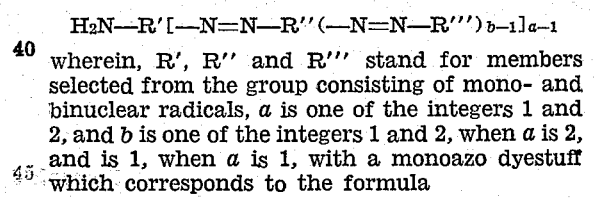

wherein R stands for a radical of the benzene series, one $x$ stands for the sulfonic acid group and the other $x$ for hydrogen, $y$ stands for a metallizable group in ortho-position to -azo-, Me is a metal selected from the group consisting of copper and chromium, and $m$ is one of the integers 1 and 2, and, where $m$ is 1, treating the thus-obtained azo dyestuff with a metal-yielding agent selected from the group consisting of copper-yielding and chromium-yielding agents.

3. A copper complex compound of a tetrakisazo dyestuff which corresponds to the formula

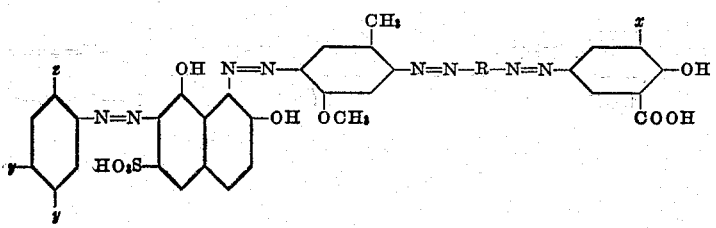

wherein R stands for a radical selected from the class consisting of

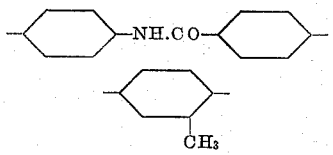

and

$x$ stands for a member selected from the class consisting of hydrogen and the sulfonic acid group, one $y$ stands for the sulfonic acid group, the other $y$ being hydrogen, $z$ stands for a member selected from the class consisting of hydroxy and carboxy, and wherein the salicylic grouping is free from copper.

4. The tetrakisazo dyestuff which corresponds to the formula

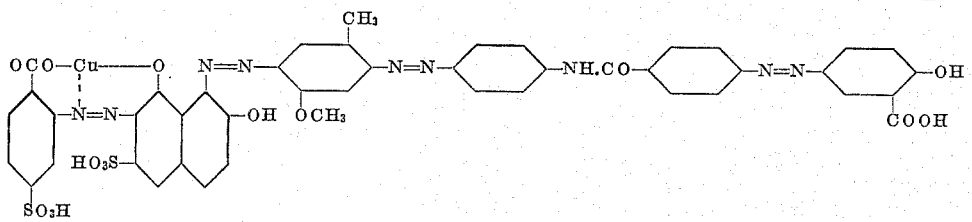

5. The tetrakisazo dyestuff which corresponds to the formula

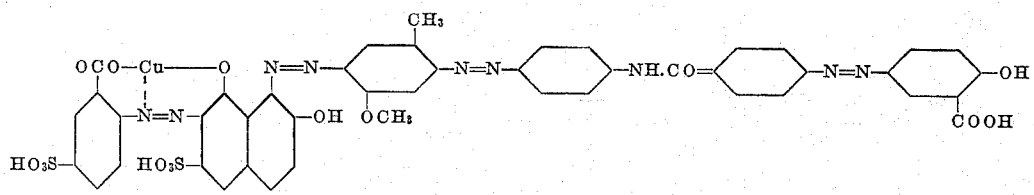

6. The tetrakisazo dyestuff which corresponds to the formula

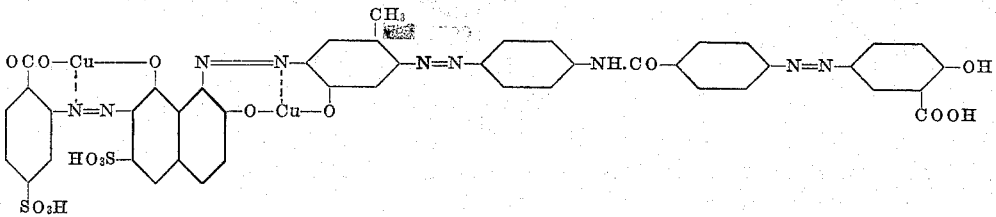

7. The tetrakisazo dyestuff which corresponds to the formula

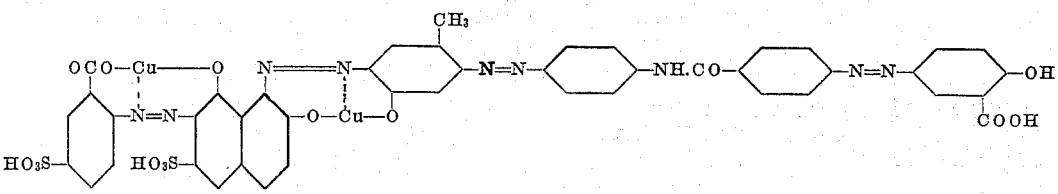

8. The tetrakisazo dyestuff which corresponds to the formula

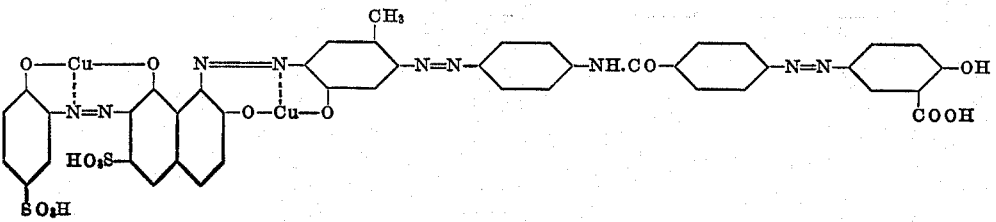

9. A process for the manufacture of a tetrakisazo dyestuff comprising the steps of coupling a diazotized amino-disazo compound which corresponds to the formula

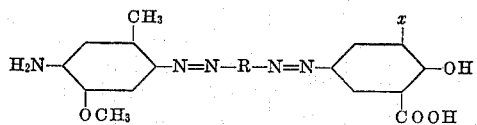

wherein R stands for a radical selected from the class consisting of

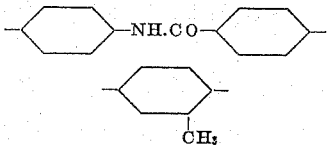

and and x stands for a member selected from the class consisting of hydrogen and the sulfonic acid group, with a monoazo dyestuff which corresponds to the formula

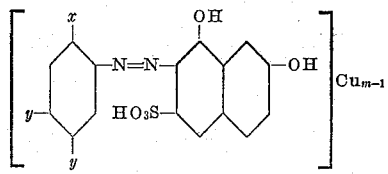

wherein one $y$ stands for the sulfonic acid group, the other $y$ being hydrogen, $z$ stands for a member selected from the class consisting of hydroxy and carboxy, and $m$ is one of the integers 1 and 2, and, where $m$ is 1, heating the thus-obtained azo dyestuff in ammoniacal aqueous solution with a salt of bivalent copper, whereby the methoxy group is split off and the salicylic grouping remains free from copper.

10. A process for the manufacture of a tetrakisazo dyestuff comprising the step of coupling the diazotized amino-disazo compound which corresponds to the formula

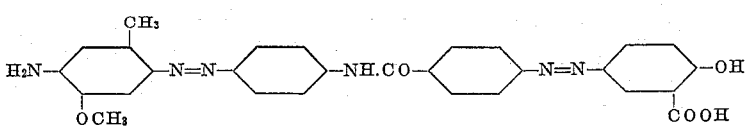

with the coppered monoazo dyestuff which corresponds to the formula

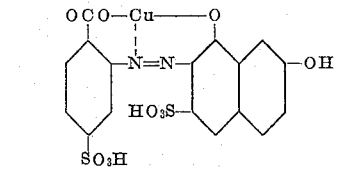

11. A process for the manufacture of a tetrakisazo dyestuff comprising the step of coupling the diazotized amino-disazo compound which corresponds to the formula

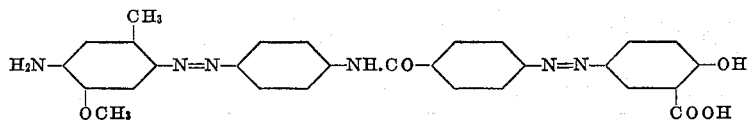

with the coppered monoazo dyestuff which corresponds to the formula

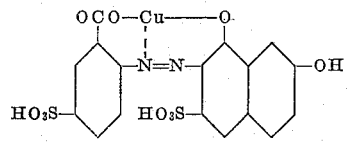

12. A process for the manufacture of a tetrakisazo dyestuff comprising the steps of coupling the diazotized amino-disazo compound which corresponds to the formula

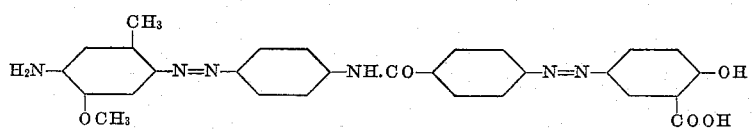

with the monoazo dyestuff which corresponds to the formula and heating the thus-obtained azo dyestuff in ammoniacal aqueous solution with a salt of bivalent copper.

13. A process for the manufacture of a tetrakisazo dyestuff comprising the steps of coupling the diazotized amino disazo compound which corresponds to the formula

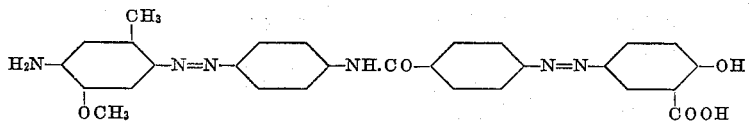

with the monoazo dyestuff which corresponds to the formula

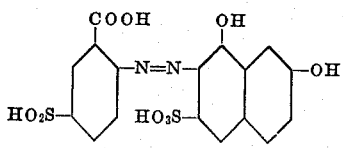

and heating the thus-obtained azo dyestuff in ammoniacal aqueous solution with a salt of bivalent copper.

14. A process for the manufacture of a tetrakisazo dyestuff comprising the steps of coupling the diazotized amino-disazo compound which corresponds to the formula

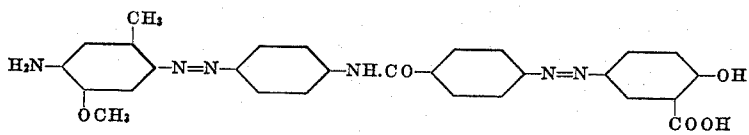

with the monoazo dyestuff which corresponds to the formula

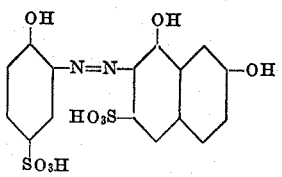

and heating the thus-obtained azo dyestuff in ammoniacal aqueous solution with a salt of bivalent copper.

HANS RUCKSTUHL.
OTTO SENN.
WALTER WEHRLI.

References Cited in the file of this patent
UNITED STATES PATENTS

| Number | Name | Date |
|---|---|---|
| 1,901,387 | Wiedemann et al. | Mar. 14, 1933 |
| 2,417,306 | Krebser et al. | Mar. 11, 1947 |